(12) United States Patent
Escolar-Piedras et al.

(10) Patent No.: US 8,447,327 B2
(45) Date of Patent: May 21, 2013

(54) METHOD AND APPARATUS FOR A BUFFERING SCHEME FOR OTDOA BASED LOCATION POSITIONING

(75) Inventors: Alberto Escolar-Piedras, Valby (DK); Jorma Johannes Kaikkonen, Oulu (FI)

(73) Assignee: Nokia Corporation, Espoo (FI)

( * ) Notice: Subject to any disclaimer, the term of this patent is extended or adjusted under 35 U.S.C. 154(b) by 147 days.

(21) Appl. No.: 12/857,519

(22) Filed: Aug. 16, 2010

(65) Prior Publication Data

US 2012/0040685 A1 Feb. 16, 2012

(51) Int. Cl.
*H04W 24/00* (2009.01)
(52) U.S. Cl.
USPC ............ 455/456.1; 455/456.6; 370/330
(58) Field of Classification Search
USPC ............ 455/456.1, 456.6; 370/330
See application file for complete search history.

(56) References Cited

U.S. PATENT DOCUMENTS

2010/0279707 A1* 11/2010 Fischer et al. ............ 455/456.1
2011/0274220 A1* 11/2011 Andgart et al. ............ 375/342
2011/0317613 A1* 12/2011 Gerstenberger et al. ...... 370/312
2012/0020320 A1* 1/2012 Issakov et al. ............ 370/330
2012/0040696 A1* 2/2012 Siomina et al. ............ 455/456.6

OTHER PUBLICATIONS

RP-080995, Work Item, "Positioning Support for LTE", TSG-RAN#42, Qualcomm, Dec. 2008.
R4-102172, CR to 36.133, "RSTD Measurement Requirements for OTDOA", May 2010.
R2-101009 LS response to R1-093729=R2-095416 on assistance information for OTDOA positioning support for LTE-remaining issues (R4-100256; to: RAN2; cc: RAN1; contact: Ericsson), Feb. 2010.
R4-102171, CR to 36.133, "RSTD Accuracy Requirements for OTDOA", May 2010.
3GPP 36.355, v9.1.0, "Evolved Universal Terrestrial Radio Access (E-UTRA); LTE Positioning Protocol (LPP)", Feb. 2010.
3GPP 36.211, v9.1.0, "Evolved Universal Terrestrial Radio Access (E-UTRA); Physical channels and modulation", Apr. 2010.
3GPP TS RAN WG4 Meeting #AH01, R4-100256,"LS Response on Assistance Information for OTDOA Positioning Support for LTE-Remaining Issues", Sophia Antipolis, France Jan. 18-22, 2012.

* cited by examiner

*Primary Examiner* — Wayne Cai
*Assistant Examiner* — Michael Irace
(74) *Attorney, Agent, or Firm* — Harrington & Smith

(57) ABSTRACT

In accordance with an example embodiment of the present invention, a method comprises receiving a plurality of reference signals (RS) from a plurality of nearby cells over a positioning time window comprising a plurality of positioning occasions; grouping the received reference signals into a set of RS groups based on a time difference between a minimum expected RS time difference (RSTD) and a maximum expected RS time difference of the received signals; buffering a subset of the set of RS groups of the received reference signals in a RS buffer whose size is based at least in part on a buffering margin and is smaller than a maximum possible time difference; measuring the buffered reference signals; and generating an observed time difference of arrival (OT-DOA) report based on the buffered subset of the set of RS groups of the received reference signals.

22 Claims, 5 Drawing Sheets

METHOD AND APPARATUS FOR A BUFFERING SCHEME FOR OTDOA BASED LOCATION POSITIONING

TECHNICAL FIELD

The present application relates generally to all apparatus and a method for a buffering scheme for an OTDOA based location positioning.

BACKGROUND

As wireless devices such as a wireless user equipment (UE) become indispensible in daily life, an increased accuracy in locating a UE is demanded for the wireless phone service. For example, the US Federal Communication Commission (FCC) requires that an emergency call from a UE be located within 50 meters for 67% of wireless calls and within 150 meters for 95% of wireless calls. One approach to achieving the desired positioning accuracy is to use network assisted observed time difference of arrival (OTDOA) for positioning 3rd Generation Partnership Project (3GPP) long-term evolution (LTE) compliant wireless devices. Based on this approach, the differences in the time of arrival of known signals sent from nearby cells are measured at the UE and the position of the UE is calculated based on the differences of arrival times. The UE may need measure these arrival time differences and report them to the network.

The signals the UE receives for the positioning purpose are called positioning reference signals (PRS). Depending on the transmission bandwidth, the positioning reference signals may be received at the UE over multiple subframes such as $N_{PRS}=1, 2, 4$ or 6 subframes for each positioning occasion where one LTE subframe lasts 1 millisecond (1ns). One positioning occasion is a time duration that may occur every $T_{PRS}=k*160$ ms ($k=1, 2, 4$ or 8) for the UE to receive the positioning reference signals. All nearby cells involved in the positioning procedure transmit synchronously their positioning reference signals so that the signals overlap in time as much as possible. The UE may have up to M positioning occasions to measure all positioning reference signals from the nearby cells in one frequency carrier and report these measurements to an associated enhanced Serving Mobile Location Center (eSMLC). The number of positioning occasions M that the UE may have to measure positioning reference signal sent from nearby cells may vary and for example may range from 4 to 16, according to a 3GPP specification.

SUMMARY

Various aspects of the invention are set out in the claims.

In accordance with an example embodiment of the present invention, a method comprises receiving a plurality of reference signals (RS) from a plurality of nearby cells over a positioning time window comprising a plurality of positioning occasions; grouping the received reference signals into a set of RS groups based on a time difference between a minimum expected RS time difference (RSTD) and a maximum expected RS time difference of the received signals; in at least one positioning occasion, buffering a subset of the set of RS groups of the received reference signals in a RS buffer whose size is based at least in part on a buffering margin and is smaller than a maximum possible time difference; measuring the buffered reference signals; and generating an observed time difference of arrival (OTDOA) report based on the buffered subset of the set of RS groups of the received reference signals.

In accordance with an example embodiment of the present invention, an apparatus comprises a radio frequency signal receiving unit configured to receive a plurality of reference signals (RS) from a plurality of nearby cells over a positioning time window comprising a plurality of positioning occasions. The apparatus also comprises a RS time difference (RSTD) burst buffer unit configured to group the received reference signals into a set of RS groups based on a time difference between a minimum expected RS time difference (RSTD) and a maximum expected RS time difference of the received signals; buffer a subset of the set of RS groups of the received reference signals in a RS buffer whose size is based at least in part on a buffering margin and is smaller than the maximum possible time difference; and measure the buffered reference signals. The apparatus also comprises a RSTD report generation unit configured to generate an observed time difference of arrival (OTDOA) report based on the buffered subset of the set of RS groups of the received reference signals.

In accordance with another example embodiment of the present invention, an apparatus comprises at least one processor; and at least one memory including computer program code, the at least one memory and the computer program code configured to, with the at least one processor, cause the apparatus to perform at least the following: receiving a plurality of reference signals (RS) from a plurality of nearby cells over a positioning time window comprising a plurality of positioning occasions; grouping the received reference signals into a set of RS groups based on a time difference between a minimum expected RS time difference (RSTD) and a maximum expected RS time difference of the received signals; buffering a subset of the set of RS groups of the received reference signals in a RS buffer whose size is based at least in part on a buffering margin and is smaller than the maximum possible time difference; measuring the buffered reference signals; and generating an OTDOA report based on the buffered subset of the set of RS groups of the received reference signals.

BRIEF DESCRIPTION OF DRAWINGS

For a more complete understanding of example embodiments of the present invention, reference is now made to the following descriptions taken in connection with the accompanying drawings in which.

DETAILED DESCRIPTION

Described herein are a method and an apparatus for buffering positioning reference signals. The reference signals from the nearby cells may arrive at the UE at different times. Given the amount of processing that need to be done to detect the reference signals in each burst with $N_{PRS}$ subframes, the received reference signals may need to be buffered and processed offline. Instead of buffering all received reference signals at once, which may require a large buffer, the reference signals with close arrival times are grouped and only a subset of the all received signals are buffered in such a way that the desired accuracy level of positioning is maintained. The method for the buffering scheme herein disclosed centers on determining a grouping of the received reference signals based on a buffering margin and the expected arrival times of the received reference signals.

An example embodiment of the present invention and its potential advantages are best understood by referring to FIGS. 1 through 5 of the drawings, like numerals being used for like and corresponding parts of the various drawings.

Figure 1:
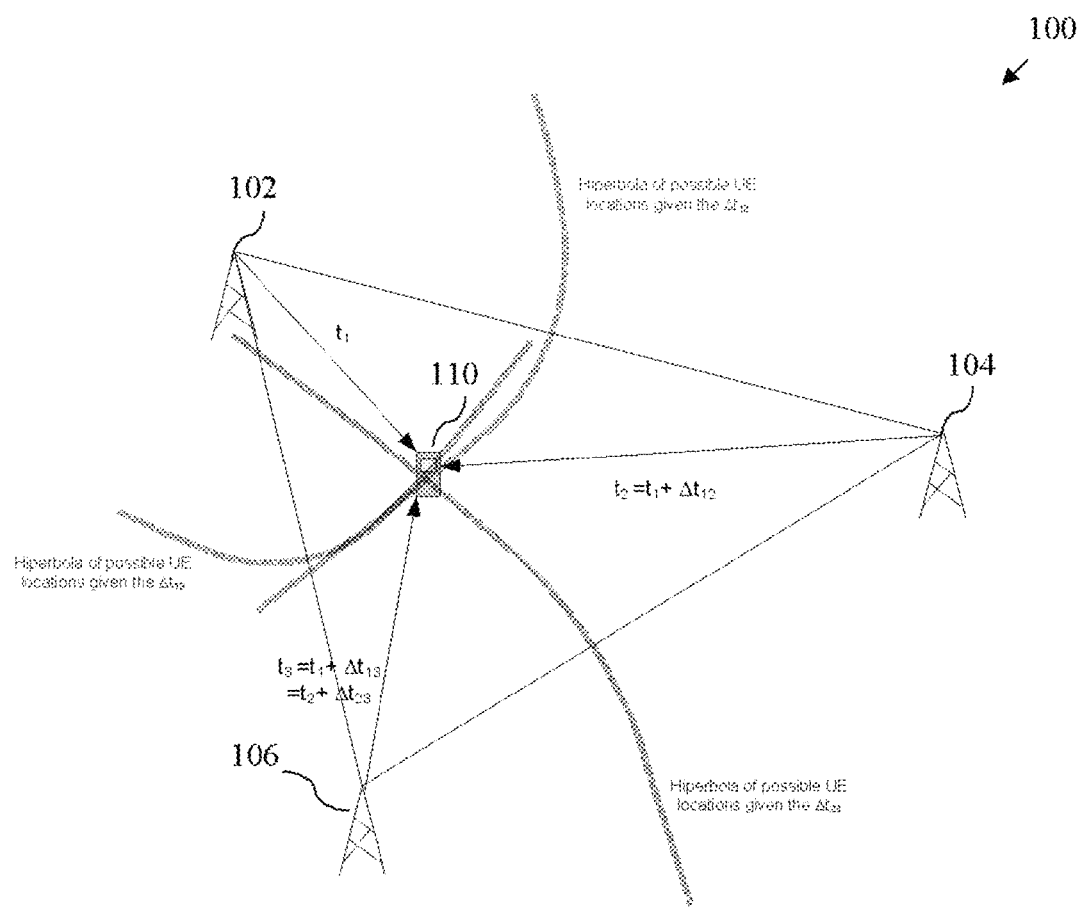
FIG. 1 illustrates an example wireless system that supports a buffering scheme for OTDOA based location positioning in accordance with an example embodiment of the invention.

FIG. 1 illustrates an example wireless system 100 that supports a buffering scheme for OTDOA based location positioning in accordance with an example embodiment of the invention. The system 100 includes a user equipment (UE) 110 and three nearby cells 102, 104 and 106. The UE 110 is within the PRS transmission range of the three cells and may receive positioning reference signals from each of the three cells.

In one example embodiment, a need arise for the network to obtain the location of the UE 110 for an emergency call or other purpose. The network may first send an assistance information package to the UE 110 so that UE 110 knows the cell identifiers of the nearby cell 102, 104 and 106, along with other information such as expected arrival time of reference signal from each of the cells. Due to the distance differences from the cells, the UE 110 may receive a first reference signal at t1 from the cell 102, a second reference signal from the cell 104 at t1+Δt and a third reference signal from the cell 106 at t1+Δt2. The UE 110 may first decide whether the time difference between the earliest arrival time t1 and the latest arrival time t1+Δt2 is greater than a buffering margin and if yes, the collected signals are grouped into multiple groups and only a subset of received reference signals are buffered at one time. The UE 110 includes a OTDOA positioning module that is configured to process the buffered signals one at a time and create a combined OTDOA report on the received reference signals and send the report to an enhanced Serving Mobile Location Center which may calculate the location of the UE 110 using the OTDOA report and a multilateration algorithm.

Figure 2:
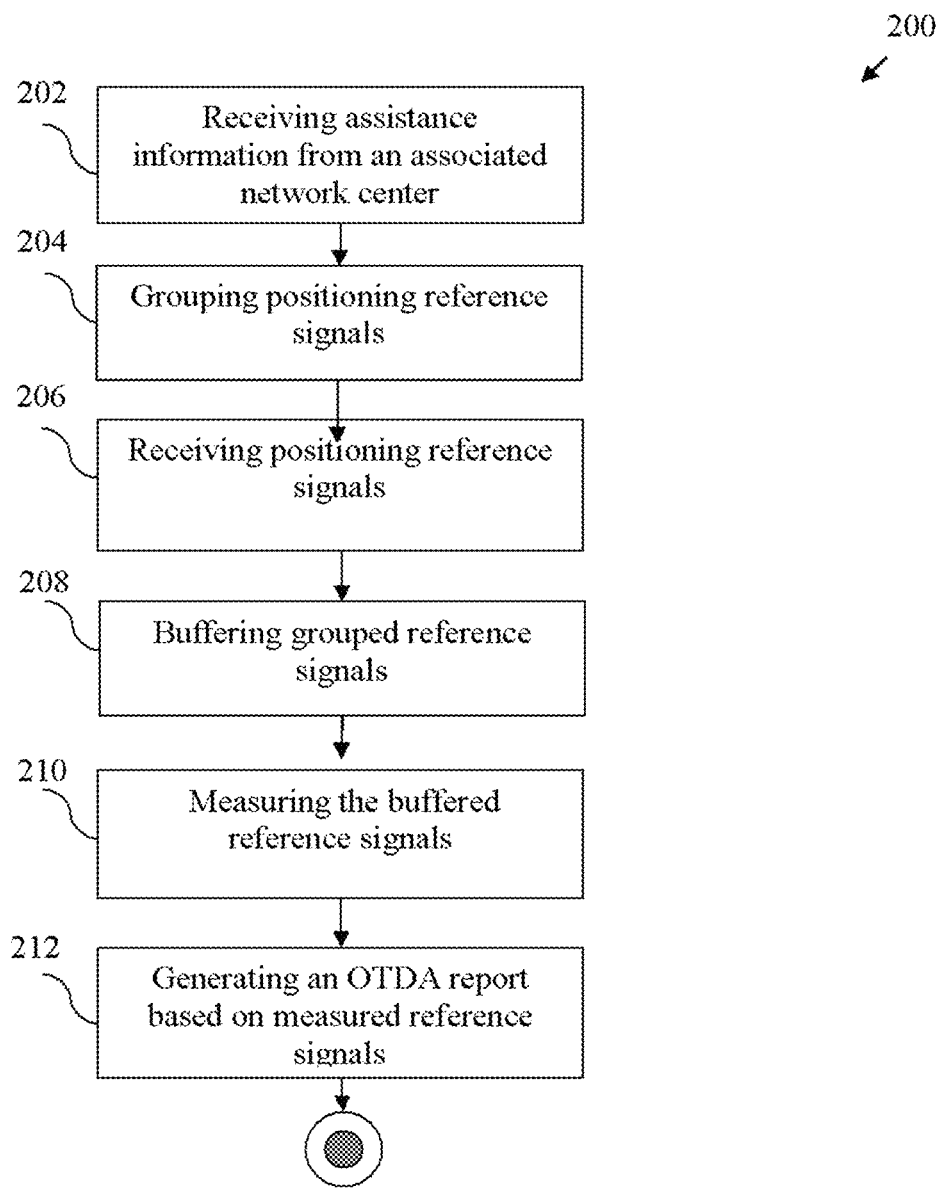
FIG. 2 illustrates an example method for buffering scheme for OTDOA based location positioning in accordance with an example embodiment of the invention.

FIG. 2 illustrates an example method 200 for a buffering scheme for OTDOA based location positioning in accordance with an example embodiment of the invention. The method 200 includes receiving assistance information from an associated network center at block 202, grouping the positioning reference signals at block 204, and receiving positioning reference signals at block 206. The method 200 may also include buffering grouped reference signals at block 208, measuring the buffered signals at block 210 and generating an OTDOA report based on the measured reference signals at block 212.

In one example embodiment, receiving the assistance information from an associated network center at block 202 may comprise receiving the assistance information from an enhanced Serving Mobile Location Center when the location service is invoked. The location service may be invoked when an emergency call is initiated from the UE or the network center initiates a search for the UE's location. The assistance information may include a list of cell identifiers (IDs) that are within the PRS range of the receiving UE, expected arrival time of a reference signal from each cell on the cell list, the reference signal bandwidth, and a number of positioning occasions included in the positioning time window, among other information. In one example embodiment, the cell list may include up to 24 cells according to the 3GPP standard and the assistance information may be sent to the UE via a standard protocol such as LTE positioning protocol (LPP).

In one example embodiment, grouping the reference signals at block 204 may include determining a time difference between a minimum expected RS time difference (RSTD) and a maximum expected RSTD of the received signals and determining a maximum possible time difference between a minimum expected RS time difference (RSTD) and a maximum expected RSTD for an entire system. Grouping the reference signals into a set of RS groups further comprises grouping the reference signals into one group if the expected RSTD from each of the nearby cells falls within a buffering margin or the time difference is equal to or smaller than the buffering margin. In another example embodiment, grouping the reference signals further comprises grouping the received reference signals into multiple groups if the time difference is greater than the buffering margin. Moreover, in one example embodiment, a grouping algorithm is defined as follows, with A representing a minimum of expected RS time differences and B a maximum of the expected RS time differences.

```
If B–A < buffering margin (bMargin)
    Group[1] = {reference signals of all cells}.
If B–A > bMargin
    i=0
    do
        i = i+1;
        Group[i] = { reference signals whose expected RSTD are
                    between A+ (i−1) *bMargin and A+i*bMargin }
    while ((A + i *bMargin) < B)
    Discard any empty Group[i]
```

In one example embodiment, receiving positioning reference signals at block 206 may include receive reference signal from each of the cells on the cell list included in the assistance information the UE received. The reference signal is broadcast from each of the nearby cells. The reference signals are received during a positioning occasion, a time window during which the UE expects to receive a reference signal from each of the cells on the cell list. The reference signals may be repeated at the next few positioning occasions and the entire duration, referred to herein as the positioning time window for the UE to receive a reference signal from each of the nearby cells may be specified by the standard protocol such as LLP and the interval between the positioning occasions may be determined by the network center and communicated to the UE as well. A large amount of reference signal data may be received during one positioning occasion if the number of nearby cells is large.

In one example embodiment, buffering grouped reference signals at block 208 may include buffering into one RS buffer the received reference signals if the differences between expected RS time differences of all received signals are within a buffering margin. In another example embodiment, buffering grouped reference signals at block 208 may include buffering a subset of the set of RS groups of the received reference signals into the RS buffer whose size is based at least in part on a buffering margin and is smaller than the maximum possible time difference that is between the minimum of expected RS time differences and the maximum of the expected RS time differences. In one example embodiment, the size of the RS buffer may be set to $N_{PRS}$ subframes+ buffering margin, if the time difference is greater than the buffering margin where $N_{PRS}$ subframes is a number of subframes for positioning reference signal bursts.

In one example embodiment, measuring the buffered reference signals in the RS buffer at block 210 may include measuring an actual arrival time of each buffered reference signal in one frequency carrier within the positioning time window. In one example embodiment, generating an OTDOA report at block 212 may include obtaining an observed time difference between a measured actual arrival time of each cell and the measured actual arrival time for the reference signals of a reference cell, optionally combining multiple observed time differences over more than one positioning occasions of the positioning time window to arrive at the OTDOA report. In an alternative example embodiment, generating an OTDOA report at block 212 may include obtaining an observed time difference between a measured actual arrival time and an expected arrival time for each of the received reference signals, optionally combining multiple observed time differences over more than one positioning occasions of the positioning time window to arrive at the OTDOA report. In an example embodiment, generating an OTDOA report at block 210 may include sending the OTDOA report to an enhanced Serving Mobile Location Center via a standard protocol such as the long term evolution (LTE) positioning protocol (LPP).

Figure 3:
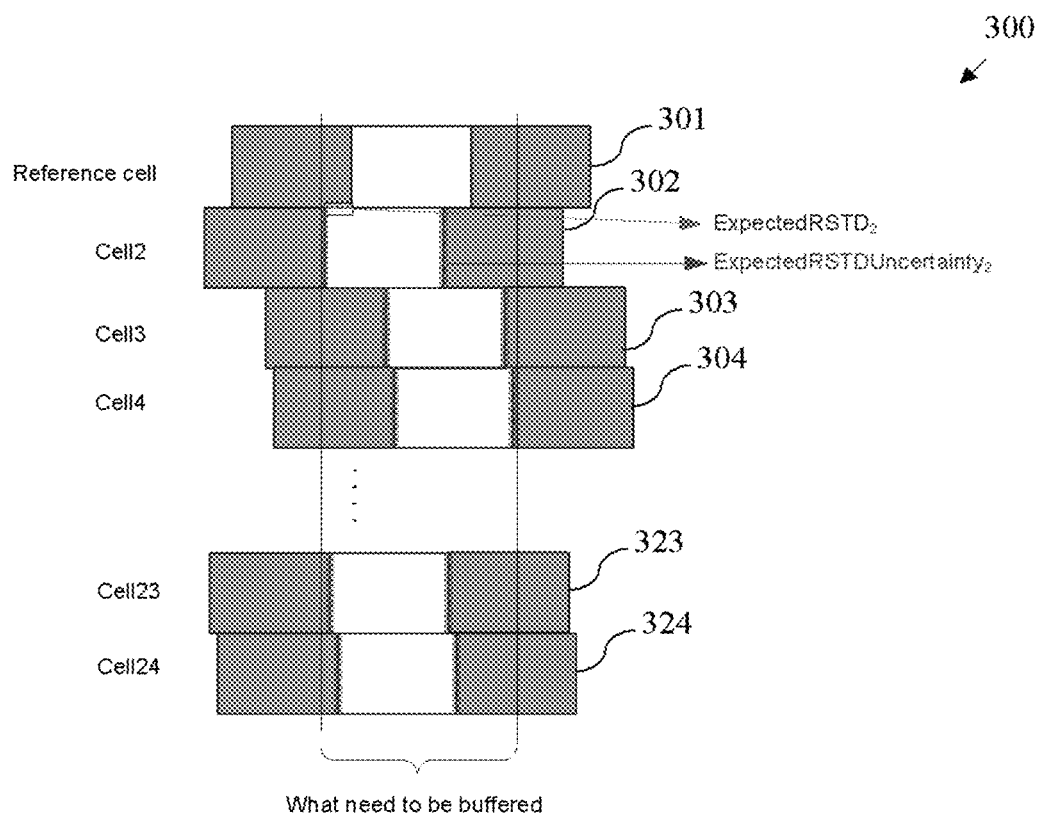
FIG. 3 illustrates an example positioning reference signal alignment between different cells in accordance with an example embodiment of the invention.

FIG. 3 illustrates an example positioning reference signal alignment 300 between different cells in accordance with an example embodiment of the invention. The example reference signal alignment 300 may include 24 cells, ranging from cell 301 to the cell 324. The cell 1 serves as reference cell and other cell's arrival times are measured against that of the reference cell. For example, for Cell2 302, the difference between the arrival time of the reference cell and that of the Cell2 302 is an expected reference signal time difference. The reference signals that spans over one positioning occasion, i.e., the earliest arrival at cell2 302 and latest arrival at cell4 304 need to be buffered. The time difference in some cases may span over multiple positioning occasions and all the data received over this span of time may need to be appropriately buffered to obtain desired resolution of reference signal data.

Figure 4:
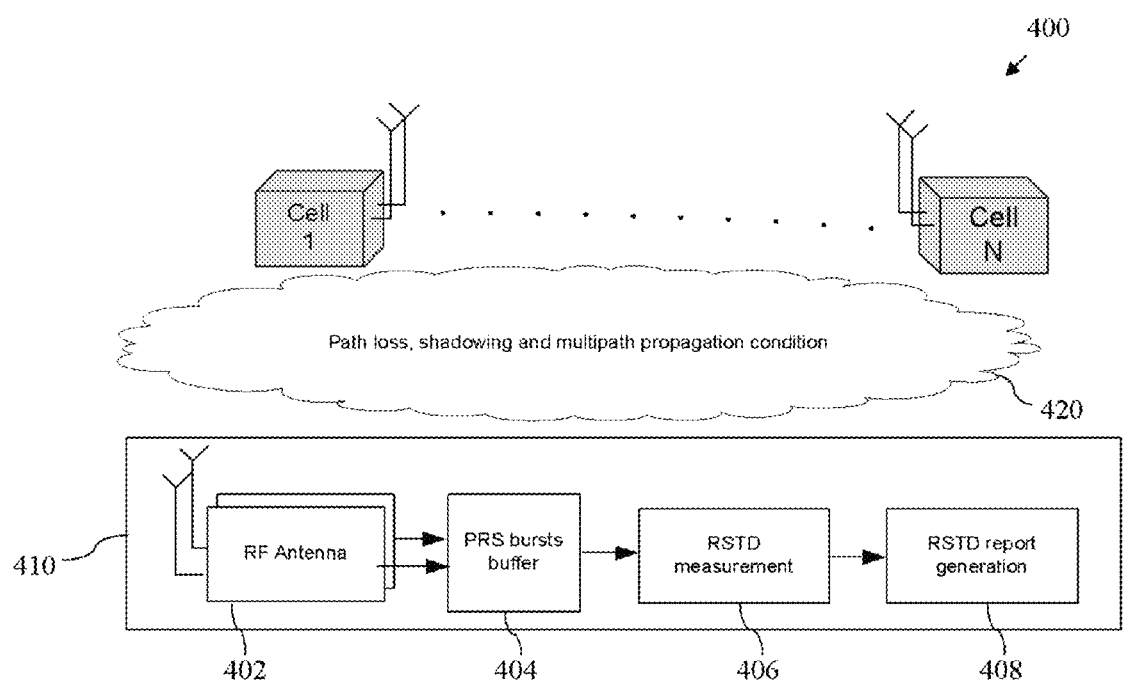
FIG. 4 illustrates an example receiving apparatus in accordance with an example embodiment of the invention.

FIG. 4 illustrates an example receiving apparatus 410 included in a wireless communication system 400 in accordance with all example embodiment of the invention. The apparatus 410 may include one or more antenna units 402, a PRS burst buffer 404, a RSTD measurement unit 406 and an RSTD report generating unit 408. The reference signals may be sent from multiple cells numbered 1 through N, and may reach the receiving apparatus 410 after going through open air 420 which may include interferences, pass loss, shadowing, and multi propagation conditions. The antenna unit 402 may be configured to receive a plurality of reference signals from a plurality of nearby cells over a positioning time window comprising a plurality of positioning occasions on a single carrier and may perform initial radio signal processing such as down conversion, amplification and filtering of the signal.

In one example embodiment, the PRS burst buffer 404 may be configured to group the received reference signals into a set of RS groups based on a time difference between a minimum of expected RS time differences and a maximum of the expected RS time differences of the received signals. The PRS burst buffer 404 may be configured to group the received reference signals from the nearby cells into one group if the expected RSTD from each of the nearby cells falls within the buffering margin or the time difference is equal to or smaller than the buffering margin. The burst buffer 404 may be further configured to group the received reference signals into N groups if the time difference is greater than the buffering margin wherein N=ceiling ((the maximum of the expected RS time differences−the minimum of the expected RS time differences)/the buffering margin) and each ith group of the N groups includes reference signals with an expected RSTD falling between A+(i−1)*buffering margin and (A+i)*buffering margin wherein A is the minimum of expected RS time differences.

The PRS burst buffer 404 may also be configured to buffer a subset of the set of RS groups of the received reference signals in a RS buffer whose size is based at least in part on a buffering margin and is smaller than a maximum possible time difference. The size of the RS buffer may be set to $N_{PRS}$ subframes+buffering margin, if the time difference is greater than the buffering margin where $N_{PRS}$ subframes is a number of subframes for positioning reference signal bursts. The RSTD measurement unit 406 may be configured to measure the buffered subset of the groups of the received reference signals via measuring an actual arrival time of each buffered reference signal in one frequency carrier within the positioning time window.

The RSTD report generating unit 408 may be configured to obtain an observed time difference between a measured actual arrival time and an expected arrival time for each of the received reference signals. In another example embodiment, generating an OTDOA report at block 212 may include obtaining an observed time difference between a measured actual arrival time of each cell and the measured actual arrival time for the reference signals of a reference cell. The RSTD report generating unit 408 may be also configured to optionally combine multiple observed time differences over more than one positioning occasions of the positioning time window to arrive at the OTDOA report and send the OTDOA report to the associated enhanced Serving Mobile Location Center via the LTE positioning protocol.

Figure 5:
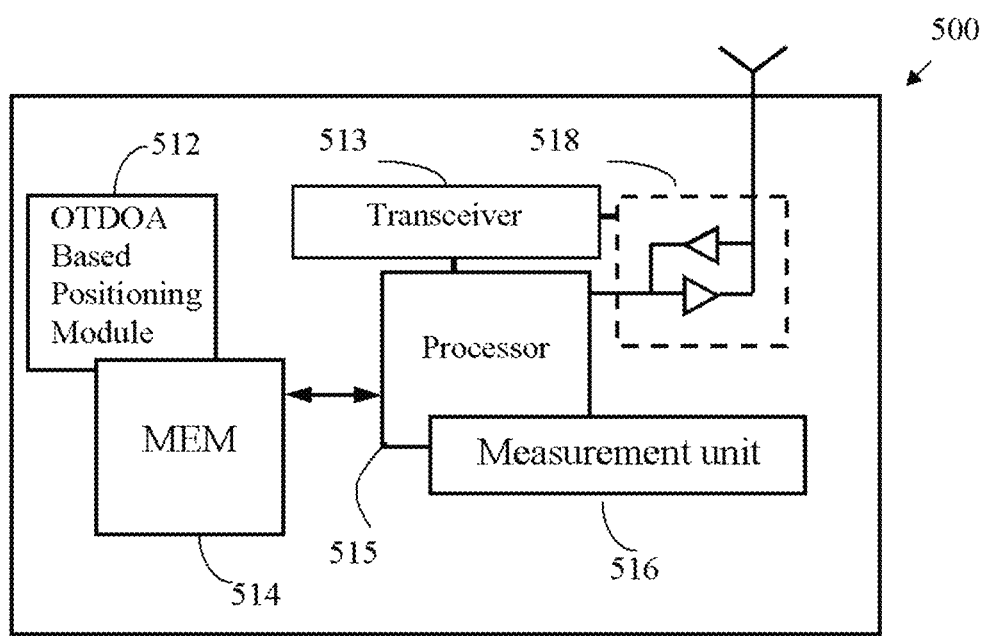
FIG. 5 illustrates an example wireless apparatus in accordance with an example embodiment of the invention.

FIG. 5 illustrates an example wireless apparatus in accordance with an example embodiment of the invention. In FIG. 5, the wireless apparatus 500 may include a processor 515, a memory 514 coupled to the processor 515, and a suitable transceiver 513 (having a transmitter (TX) and a receiver (RX)) coupled to the processor 515, coupled to an antenna unit 518. The memory 514 may store programs such as an OTDOA based positioning module 512.

The processor 515 or some other form of generic central processing unit (CPU) or special-purpose processor such as digital signal processor (DSP), may operate to control the various components of the wireless apparatus 500 in accordance with embedded software or firmware stored in memory 514 or stored in memory contained within the processor 515 itself. In addition to the embedded software or firmware, the processor 515 may execute other applications or application modules stored in the memory 514 or made available via wireless network communications. The application software may comprise a compiled set of machine-readable instructions that configures the processor 515 to provide the desired functionality, or the application software may be high-level software instructions to be processed by an interpreter or compiler to indirectly configure the processor 515.

In an example embodiment, the OTDOA based positioning module 512 may be configured to group the reference signals into a set of RS groups based on a time difference between a minimum expected RSTD and a maximum expected RSTD of the received signals and to receive a plurality of reference signals (RS) from a plurality of nearby cells over a positioning time window. The OTDOA positioning module 512 may also be configured to buffer a subset of the set of RS groups of the received reference signals in a RS buffer whose size is based at least in part on a buffering margin and is smaller than the time difference and generate an OTDOA report based on the buffered subset of the set of RS groups of the received reference signals.

In one example embodiment, the transceiver 513 is for bidirectional wireless communications with another wireless device. The transceiver 513 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 513, portions of the antenna unit 518, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 518 may be provided to convert between wireless signals and electrical signals, enabling the wireless apparatus 500 to send and receive information from a cellular network or some other available wireless communications network or from a peer wireless device. In an embodiment, the antenna unit 518 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 518 may include antenna tuning and/or impedance matching components, RF power amplifiers, and/or low noise amplifiers.

As shown in FIG. 5, the wireless apparatus 500 may further include a measurement unit 516, which measures the signal strength level that is received from another wireless device, and compare the measurements with a configured threshold. The measurement unit may be utilized by the wireless apparatus 500 in conjunction with various exemplary embodiments of the invention, as described herein.

In general, the various exemplary embodiments of the wireless apparatus 500 may include, but are not limited to, user equipment or a wireless device such as a portable computer having wireless communication capabilities, Internet appliances permitting wireless Internet access and browsing, as well as portable units or terminals that incorporate combinations of such functions. In one embodiment, the wireless apparatus 500 may be implemented in the UE 110 of FIG. 1.

Without in any way limiting the scope, interpretation, or application of the claims appearing below, a technical effect of one or more of the example embodiments disclosed herein is to reduce the amount of memory needed to implement the OTDOA feature in LTE compliant UEs and thus substantially reduce the cost for implementing the OTDOA feature.

Embodiments of the present invention may be implemented in software, hardware, application logic or a combination of software, hardware and application logic. The software, application logic and/or hardware may reside on a base station, an access point or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising
receiving by a user equipment a plurality of reference signals from a plurality of nearby cells over a positioning time window comprising a plurality of positioning occasions;
grouping the received reference signals into a set of reference signal groups based on a buffering margin and a time difference between a minimum expected reference signal time difference and a maximum expected reference signal time difference of the received signals, wherein grouping the received reference signals further comprises grouping the received reference signals into N groups, wherein each ith group of the N groups includes those reference signals each with the expected reference signal time difference falling between A+(i−1)* buffering margin and (A+i)* buffering margin wherein A is the minimum expected reference signal time difference of the received reference signals;
buffering, during at least one of the plurality of positioning occasions, a subset of the set of reference signal groups of the received reference signals in a reference signal buffer whose size is based at least in part on the buffering margin, wherein the size of the reference signal buffer determined by the buffering margin is effective to implement a predetermined positioning accuracy of an observed time difference of arrival report, the subset comprising reference signals received at different times relative to each other and having an expected reference signal time difference between said different times; and
generating the observed time difference of arrival report based on the buffered subset of the set of reference signal groups of the received reference signals.

2. The method of claim 1 wherein grouping the received reference signals into the set of reference signal groups further comprises grouping the received reference signals into one group if the expected reference signal time difference from each of the nearby cells falls within the buffering margin or the time difference is equal to or smaller than the buffering margin.

3. The method of claim 1 wherein grouping the reference signals further comprises grouping the received reference signals into more than one group if the time difference is greater than the buffering margin.

4. The method of claim 1 wherein a size of the reference signal buffer is set to $N_{PRS}$ subframes +buffering margin, if the time difference is greater than the buffering margin wherein $N_{PRS}$ subframes is a number of subframes for a reference signal burst.

5. The method of claim 1 further comprising measuring at least part of the buffered subset of the reference signal groups of the received reference signals over the positioning time window.

6. The method of claim 5 wherein measuring the buffered subset of the reference signal groups of the received reference signals further comprises measuring an actual arrival time of each buffered reference signal in one frequency carrier within the positioning time window.

7. The method of claim 6 wherein generating the observed time difference of arrival report comprises obtaining an observed time difference between a measured actual arrival time of each reference signal and the measured actual arrival time reference signals of a reference cell, optionally combining multiple observed time differences over at least one positioning occasion of the positioning time window to arrive at the observed time difference of arrival report and sending the observed time difference of arrival report to an enhanced Serving Mobile Location Center via a long term evolution positioning protocol.

8. The method of claim 1 further comprising receiving assistance information from an enhanced Serving Mobile Location Center, the assistance information comprising at least one of a list of identifiers of the nearby cells, the expected reference signal time difference for each of the nearby cells, a number of times each reference signal is repeated, and an interval between two positioning occasions.

9. The method of claim 1 further comprising adjusting the buffering margin based at least in part on a past history of reference signal reception quality, a required accuracy level of the received reference signals, and a size of an available buffer.

10. An apparatus, comprising
a radio frequency signal receiving unit configured to receive by a user equipment a plurality of reference signals from a plurality of nearby cells over a positioning time window comprising a plurality of positioning occasions;
a reference signal time difference burst buffer unit configured to
group the received reference signals into a set of reference signal groups based on a buffering margin and a time difference between a minimum expected reference signal time difference and a maximum expected reference signal time difference of the received signals, wherein the received reference signals are grouped into N groups, wherein each ith group of the N groups includes those reference signals each with the expected reference signal time difference falling between A+(i−1)* buffering margin and (A+i)* buffering margin wherein A is the minimum expected reference signal time difference of the received reference signals; and
buffer, in at least one of the plurality of positioning occasions, a subset of the set of reference signal groups of the received reference signals in a reference signal buffer whose size is based at least in part on the buffering margin, wherein the size of the reference signal buffer determined by the buffering margin is effective to implement a predetermined positioning accuracy of an observed time difference of arrival report, the subset comprising reference signals received at different times relative to each other and having an expected reference signal time difference between said different times; and
a reference signal time difference report generation unit configured to generate the observed time difference of arrival report based on the buffered subset of the set of reference signal groups of the received reference signals.

11. The apparatus of claim 10 further comprising a measurement unit configured to measure the buffered subset of the reference signal groups of the received reference signals over the positioning time window by measuring an actual arrival time of each buffered reference signal.

12. The apparatus of claim 10 wherein the reference signal time difference burst buffer unit is further configured to group the received reference signals from the nearby cells into one group if the expected reference signal time difference from each of the nearby cells falls within the buffering margin or the time difference is equal to or smaller than the buffering margin.

13. The apparatus of claim 12 wherein the reference signal time difference burst buffer unit is further configured to group the received reference signals into N groups if the time difference is greater than the buffering margin wherein each group of the N groups includes reference signals having an expected reference signal time difference between reference signals of said each group of the N groups within the buffering margin.

14. The apparatus of claim 10 wherein the radio frequency signal receiving unit is configured to support at least one of a time division duplex and a frequency division duplex.

15. The apparatus of claim 10 wherein the radio frequency signal receiving unit is further configured to receive assistance information from an enhanced Serving Mobile Location Center, the assistance information comprising at least one of a list of identifiers of the nearby cells, the expected reference signal time difference for each of the nearby cells, a number of times each reference signal is repeated, and the positioning time window.

16. The apparatus of claim 10 wherein a size of the reference signal buffer is set to $N_{PRS}$ subframes +buffering margin, wherein the $N_{PRS}$ subframes is a number of subframes for a reference signal burst.

17. An apparatus, comprising:
at least one processor; and
at least one memory including computer program code, the at least one memory and the computer program code configured to, with the at least one processor, cause the apparatus to perform at least the following:
grouping a plurality of reference signals into a set of reference signal groups based on a buffering margin and a time difference between a minimum expected reference signal time difference and a maximum expected reference signal time difference of the received signals, wherein grouping the received reference signals further comprises grouping the received reference signals into N groups, wherein each ith group of the N groups includes those reference signals each with the expected reference signal time difference falling between A+(i−1)*buffering margin and (A+i)*buffering margin wherein A is the minimum expected reference signal time difference of the received reference signals;
receiving the plurality of reference signals reference signal by a user equipment from a plurality of nearby cells over a positioning time window comprising a plurality of positioning occasions;

buffering, in at least one of the plurality of positioning occasions, a subset of the set of reference signal groups of the received reference signals in a reference signal buffer whose size is based at least in part on the buffering margin, wherein the size of the reference signal buffer determined by the buffering margin is effective to implement a predetermined positioning accuracy of an observed time difference of arrival report, the subset comprising reference signals received at different times relative to each other and having an expected reference signal time difference between said different times; and generating the observed time difference of arrival report based on the buffered subset of the set of reference signal groups of the received reference signals.

18. The apparatus of claim 17 wherein the at least one memory and the computer program code are further configured to measure the buffered subset of the reference signal groups of the received reference signals over the positioning time window to measure an actual arrival time of each buffered reference signal.

19. The apparatus of claim 17 wherein the at least one memory and the computer program code are further configured to group the reference signals from the nearby cells into one group if the expected reference signal time difference from each of the nearby cells falls within the buffering margin and to group the reference signals into N groups if the time difference is greater than the buffering margin wherein each group of the N groups includes reference signals each with an expected reference signal time difference which differs less than the buffering margin from each other.

20. The method of claim 1, wherein said buffering margin is effective to minimize the reference buffer size so that an observed time difference arrival report based on the buffered subset enables a desired positioning accuracy.

21. The apparatus of claim 10, wherein said buffering margin is effective to minimize the reference buffer size so that an observed time difference arrival report based on the buffered subset enables a desired positioning accuracy.

22. The apparatus of claim 17, wherein said buffering margin is effective to minimize the reference buffer size so that an observed time difference arrival report based on the buffered subset enables a desired positioning accuracy.

* * * * *

UNITED STATES PATENT AND TRADEMARK OFFICE
CERTIFICATE OF CORRECTION

PATENT NO. : 8,447,327 B2  Page 1 of 1
APPLICATION NO. : 12/857519
DATED : May 21, 2013
INVENTOR(S) : Alberto Escolar-Piedras and Jorma Johannes Kaikkonen It is certified that error appears in the above-identified patent and that said Letters Patent is hereby corrected as shown below:

In the Specification:
Column 6, Line 1, change "(A+i)*" to --A+i*--.

In the Claims:
In Claim 1:
Column 8, Line 40, change "(A+i)*" to --A+i*--.

In Claim 10:
Column 9, Line 55, change "(A+i)*" to --A+i*--.

In Claim 17:
Column 10, Line 61, change "(A+i)*" to --A+i*--.

Signed and Sealed this
Twenty-fourth Day of December, 2013

Margaret A. Focarino
*Commissioner for Patents of the United States Patent and Trademark Office*